United States Patent [19]

Brown

[11] Patent Number: 4,733,929

[45] Date of Patent: Mar. 29, 1988

[54] DIFFUSER FIBER INCIDENT ENERGY CONCENTRATOR AND METHOD OF USING SAME

[76] Inventor: David C. Brown, 4751 State Rte. 34, Winfield, W. Va. 25213

[21] Appl. No.: 826,304

[22] Filed: Feb. 5, 1986

[51] Int. Cl.$^4$ .............................. G02B 6/26; F21V 7/04
[52] U.S. Cl. ................................ 350/96.15; 350/96.10; 350/96.29; 350/96.24; 350/96.34; 350/320; 362/32
[58] Field of Search ............... 350/96.10, 96.29, 96.30, 350/96.34, 96.24, 96.15, 320; 362/32; 250/227

[56] References Cited

U.S. PATENT DOCUMENTS

| | | | |
|---|---|---|---|
| 4,227,939 | 10/1980 | Zewail et al. | 250/227 X |
| 4,422,719 | 12/1983 | Orcutt | 350/96.30 |
| 4,425,907 | 1/1984 | Younghouse | 350/96.10 |
| 4,466,697 | 8/1984 | Daniel | 350/96.30 |
| 4,564,261 | 1/1986 | Kojima et al. | 350/96.24 |
| 4,626,068 | 12/1986 | Caldwell | 350/96.34 |
| 4,637,686 | 1/1987 | Iwamoto et al. | 350/96.29 |
| 4,650,992 | 3/1987 | Ruhrmann | 250/227 |

FOREIGN PATENT DOCUMENTS 57-207204 12/1982 Japan .............................. 350/96.29

Primary Examiner—William L. Sikes
Assistant Examiner—Brian M. Healy
Attorney, Agent, or Firm—Jim Zegeer

[57] ABSTRACT

This invention relates to a coaxial diffuser optical fiber wave guide incident radiation energy concentrator using internal diffusion to scatter incident radiation energy into guided modes to effect a cumulative propagation of the energy along the wave guide axis which creates a concentration of the incident radiation energy at the collector's edges.

18 Claims, 3 Drawing Figures

DIFFUSER FIBER INCIDENT ENERGY CONCENTRATOR AND METHOD OF USING SAME

BACKGROUND OF THE INVENTION

1. Field of Invention

A coaxial diffuser optical fiber wave guide using a diffuser along the fibers axis to effect an internal scatter of incident radiation to permit a fraction of the scattered incident radiation to enter a guided mode in the optical fiber wave guide and be propagated to the fiber end thereby creating a concentration of the incident radiation energy at the fiber end.

2. Description of the Prior Art

Certain radiation energy can be utilized more efficiently when concentrated, for example solar energy radiation or luminescence from photophosphorescence. The phenomenon of total reflection at the interface between material of different refractive indexes, known as Snell's law, has been used to concentrate radiation energy. This principle is the basis of dielectric wave guides such as optical fibers. However, with respect to using dielectric wave guides for concentration incident radiation, an important consequence of Snell's law is that a source of radiation outside the wave guide core cannot contribute to guided modes. The incident radiation will reflect and refract at the wave guide boundaries, but none of the wave's energy will be trapped as a guided wave.

One method to overcome this problem is used by Zewail (U.S. Pat. No. 4,227,939). Fluorescent dye in the wave guide core absorbs the incident radiation and by fluorescence emission scatter the energy within the core to permit photon capture in guided modes. The method requires a variety of fluorescent material to cover the solar spectrum due to the specific absorption wave lengths associated with each fluorescent dye.

The complication of this approach arises from the need to maximuze the absorption of incident photons without creating unacceptable transmission losses in the guided modes of the wave guide. The device is a slab type dielectric wave guide in which the trapped photons are reflected repeatedly across the plate's central axis and through various fluorescent absorbers. A fraction of the photons energy is dissipated during each fluorescent cascade event which causes a lossy collector.

Commercially available optical fibers can only capture incident radiation in guided modes through events cuased by imperfections in the fibers. Although these fibers are satisfactory in applications such as cores for short luminescent fiber markers, the inability of the incident radiation, in this example backscatter photophosphorescence, to enter guided modes limits the fibers ability to concentrate the incident radiation.

SUMMARY OF THE INVENTION

Accordingly several objects of my invention will eliminate the disadvantages of the prior art.

To effect the required internal scattering of the incident radiation, a diffuser is used. A coaxial diffuser is created within the core region of a circularly cylindrical fiber by forming microspheres of air or other suitable material. The interface between the sphere and core material will reflect and refract the incident radiation as the waves travel through the core.

For example, using polycarbonate with a refractive index of $n=1.58$ for the core and microspheres of air, $n=1.00$, sixty percent of the incident radiation in the green-yellow region of the visible spectrum will be scattered. Considering the direction of the incident radiation as vertical, the scatter band will be approximately from 11° above the horizontal to 45° below the horizontal. The reflected and refracted radiation will repeatedly strike neighboring microspheres creating the desired internal radiation scatter.

To effect the trapping and the subsequent propagation of the trapped radiation that is required for concentration of the radiation energy, a fiber of transparent material with a cladding of transparent material of lower refractive index is used. The fiber is commonly known as an optical fiber wave guide. The fiber diameter should be large compared to the incident radiation wave length so the effects from diffraction may be neglected. The diameter of the coaxial diffuser is in the range of one third the fiber's core diameter.

The coaxial diffuser only allows skew waves to enter guided modes. Any meridional ray will be scattered by the diffuser as it attempts to cross the fibers axis. Skew waves guided modes are left and right handed helices that spiral along the fiber core in both directions. The tendency of the helix guide mode to progress along the fiber at a constant distance from the fiber's axis minimizes interference between the trapped waves and the incident radiation scatter process. This action of scattering and and trapping incident radiation is cumulative along the fiber wave guide axis which creates the desired linear concentration of incident radiation.

DESCRIPTION OF THE PREFERRED EMBODIMENT

Figure 1:
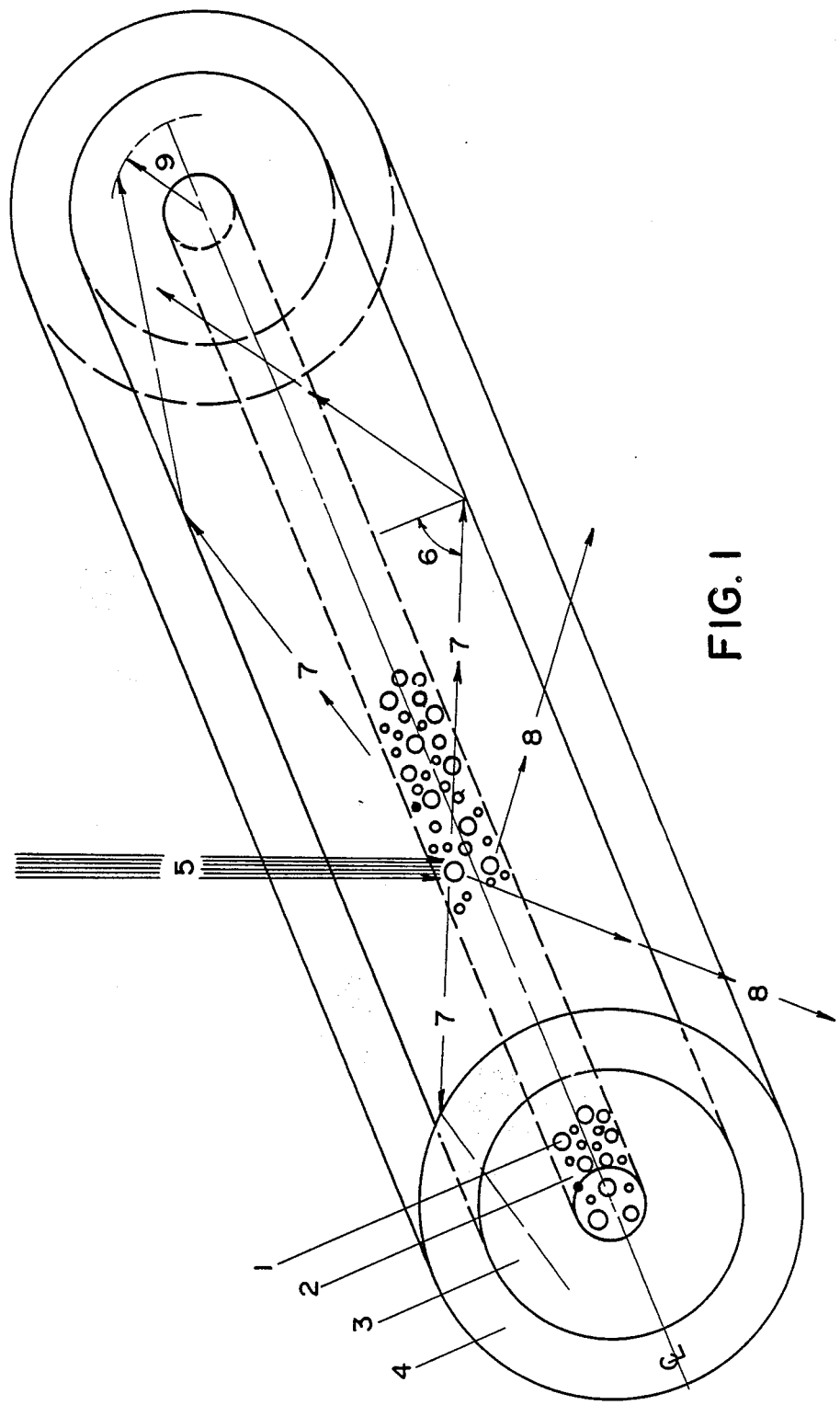
FIG. 1 is a partially sectional perspective view of the optical fiber containing the diffuser along the fiber axis.

Referring to FIG. 1, the coaxial diffuser region (2) is shown in the core (3). The diffuser region (2) and core (3) is a cylinder of optically clear material with respect to the incident radiation wave length. For visible light, the material may be a soda glass, crown glass, flint glass, acrylic polymer methylmethacrylate, polystyrene, polycarbonate, methylmethacrylate stryrene copolymer, allyldiglycol carbonate, polymethylpentane, or other suitable material that become commercially available and apparent to those skilled in the material art.

The microsphere or microparticle (1) is formed by inoculating core material with a material of the desired reflective properties or refractive index. The material may be air, water, argon, carbon dioxide, helium, hydrogen, methane, nitrogen, silver, aluminum, magnesium carbonate, rutile, zircon, glass of a higher or lower refractive index with respect to the core material, or other suitable material that become commercially available and apparent to those skilled in the material art.

Figure 2:
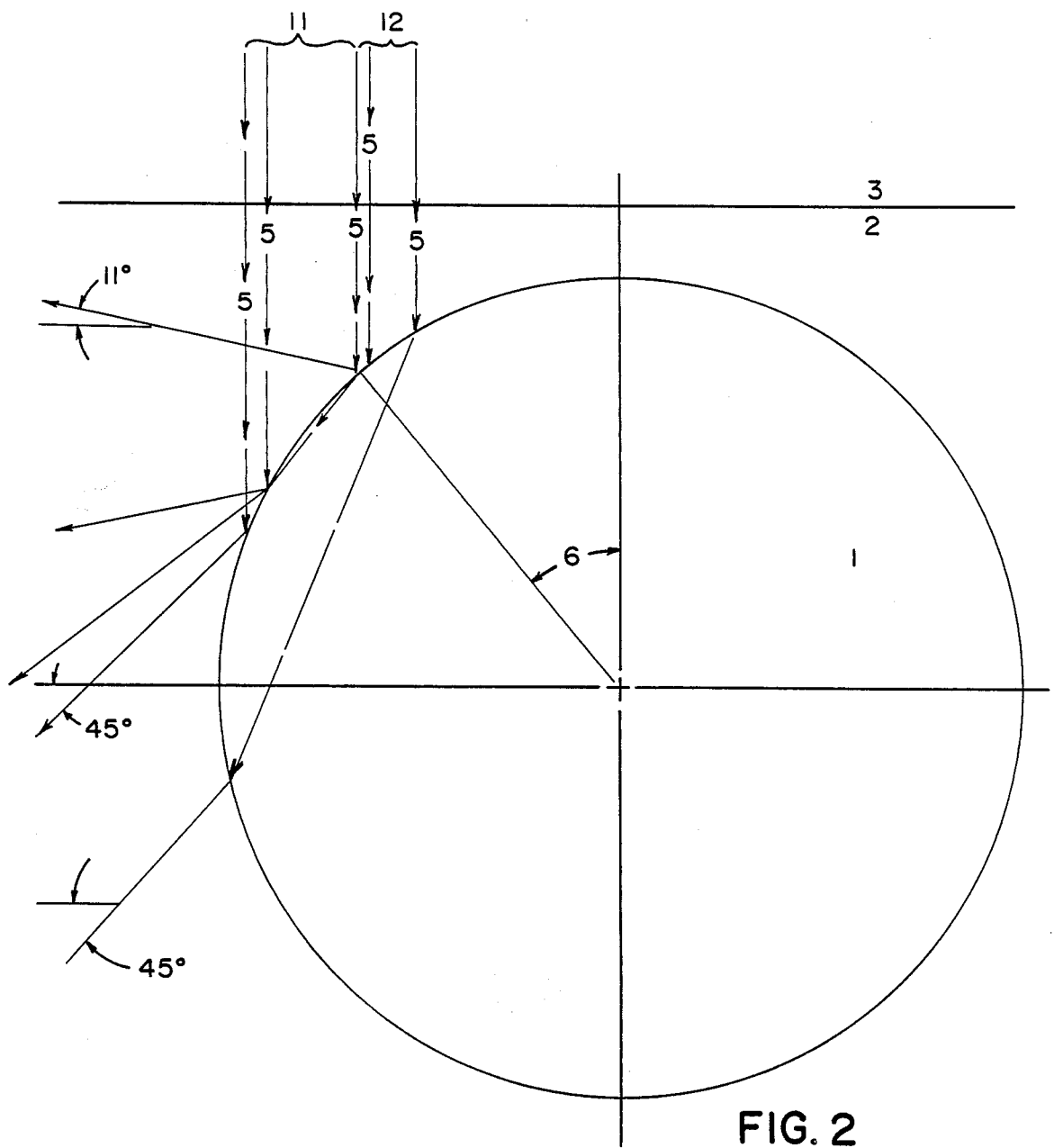
FIG. 2 is a cross section of a microsphere in the diffuser showing bands of reflection and refraction of the incident radiation.

Referring to FIG. 2, a microsphere of air (1) is shown near the interface between the diffuser (2) and the core (3). The core-diffuser material is polycarbonate. Band (11) is the zone where incident radiation (5) is reflected off the interface between the microsphere and the diffuser matrix (2) at an angle of 45° or less from the horizon. Band (12) is where the incident radiation (5) strikes the interface at an angle (6) less than the critical angle of incident and enters the microsphere, but is still refracted back into the diffuser at an angle less than 45° from the horizontal. The horizon is with respect to the direction of the incident radiation being vertical. The choice of 45° below the horizon is arbitrary, however rays entering on into the diffuser's body at these angles have a very high probability of additional scattering by surrounding microspheres. Band 11 and band 12 represent approximately sixty percent of the target area of a microsphere. The microspheres (1) should be of the size that refraction and reflection will occur, spacing to assure an interface is in the incident radiation's pathway (5), and sufficient numbers to effect the diffusion of the incident radiation energy.

The diffuser (2) shown is created from polycarbonate containing air which form microspheres during the manufacturing of the fiber. This initial fiber is encased in additional polycarbonate and formed into a fiber core (3) by manners of application well-known to those skilled in the manufacturing of optical fibers.

Referring again to FIG. 1, the cladding (4) may be any material that is optically clear to the incident radiation, has a lower index of refraction than the core (3) material, and is physically and chemically compatible with the core material. For visible light, the cladding material can be a soda glass, crown glass, flint glass, polystyrene, air, polycarbonate, styrene acrylonitrile, methylmethacrylate styrene copolymer, allyldiglycol cargonate, polymethylpentane, other commercially available material with suitable properties, or as shown in (4) an acrylic polymer methylmethacrylate. The cladding (4) is appled to the core (3) by methods well-known to and commercially available from those skilled in the manufacturing of optical fibers. As is common practice in the trade, the fiber is designed to ensure that the guided mode field does not reach the outer boundary of the cladding.

The fiber dimensions will vary and depend on the refractive index of the core (3), the cladding (4) and the microspheres (1) or particles in the diffuser region (2), and the wave length of the incident radiation to be concentrated. The design object being to maximize the beneficial scatter of incident radiation while minimizing interference to the skew wave guide modes.

For the fiber shown in FIG. 1, the critical angle of incident (6) for total internal reflection at the core and cladding interface is 70.57°. By creating a uniform internal scatter of the incident radiation energy, approximately twenty percent of the incident radiation energy (7) will strike the core and cladding interface at an angle permitting the energy waves to enter guided modes. The coaxial diffuser (2) requires that trapped energy waves be skew rays (7) and the guided modes to be left and right handed helices that spiral along the fiber core in both directions at a constant distance (9) from the core axis. The embodiment shown has a diffuser region (2) with a diameter one third the core (3) diameter, therefore, eighty eight percent of the core's cross sectional area is available for wave propagation guided modes.

Figure 3:
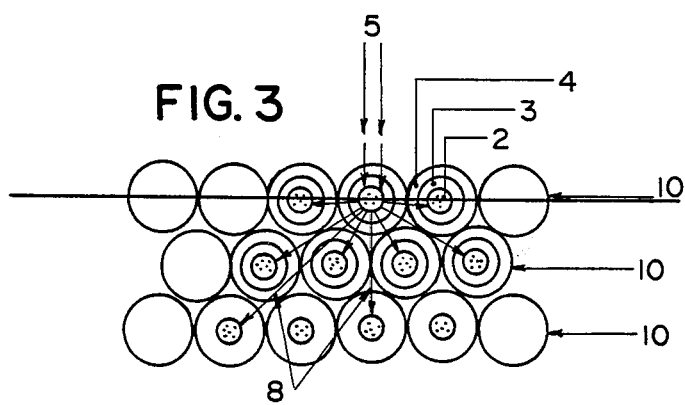
FIG. 3 is a cross section view of the coaxial diffuser optical fiber formed into layers to enhance concentration of incident radiation such as solar radiation energy.

Referring to FIG. 3, approximately twenty percent of the total incident radiation (5) is trapped within guided modes in the initial fiber layer (10). Since the remaining incident radiation is scattered uniformly in all directions by the diffuser, half the remaining scattered incident radiation (8) energy will enter the next fiber layer (10). The trapping, reflection and refraction of the remaining incident radiation will be repeated at each fiber layer (10). With the embodiment shown, air microshperes (1) in the diffuser (2), a diffuser and core (3) of polycarbonate and a cladding (4) of acrylic polymer methylmethacrylate with the fibers in layers (10), over thirty percent of the incident radiation energy may be trapped in guide modes within the individual fibers. The trapping of the incident radiation energy is cumulative along the fiber axis up to the fiber energy transmission capacity. Propagation of the trapped energy to the fiber end effects a concentration of the incident radiation energy.

It is to be realized that only one preferred embodiment of the invention designed as the optical wave guide for use in a luminescent fiber marker has been described and that numerous alterations, modifications, substitutions are all permissible without departing from the spirit and scope of the invention as defined in the following claims.

What is claimed is:

1. An incident radiant energy concentration device comprising an optical wave guide element having an edge and a length dimension, and being a cylindrical optical wave guide, diffuser means coaxialy located within said optical wave guide to convert incident radiation energy within said wave guide to effect capture of energy in guided modes of said wave guide and by cumulative propagation of trapped energy along said wave guide length dimension and effect a concentration of incident radiation energy at the device's edge.

2. An incident radiant energy concentration device as defined in claim 1 wherein said wave guide is circularly cylindrical.

3. A device according to claim 2 in which the diffuser means is a coaxial region of the wave guide core aligned along the center line of the wave guide core and containing microspheres and/or microparticles of material with the ability to reflect and or refract the incident radiation energy to effect a uniform internal scatter of the incident radiation energy within the wave guide core.

4. A device according to claim 3 in which the microspheres and microparticles that effect a scatter of the incident radiation energy are comprised of one or a combination of the following compounds and elements: air, water, argon, carbon dioxide, helium, hydrogen, methane, nitrogen, silver, aluminum, magnesium carbonate, rutile, zircon or glass of a higher or lower refractive index with respect to the core material.

5. A device according to claim 3 in which the wave guide core is a material transparent to the incident radiation wave lengths selected from the group consisting of soda glass, crown glass, flint glass, acrylic polymer methylmethacrylate, polystyrene, polycarbonate, methylmethacrylate styrene copolymer, allyldiglycol carbonate or polymethylpentane.

6. A device according to claim 3 in which the wave guide core is encased by an outer cladding of material with a lower refractive index than the core material.

7. A device according to claim 6 in which the outer cladding is a material transparent to the incident radiation wave lengths selected from the group consisting of soda glass, crown glass, flint glass, acrylic polymer methylmethacrylate, air, polystyrene, polycarbonate, methylmethacrylate styrene copolymer, allylcliglycol carbonate or polymethylpentane.

8. A device for concentrating radiant energy comprising, an optical wave guide having a length dimension extending between a pair of ends, and a first external surface exposed to receive incident radiation between the ends of said length dimension and a second external surface exposed to emit radiation at at least one of said ends of said length dimension,
 means for exposing said first external surface to incident radiation,
 means coaxially located within said optical wave guide for internally changing the direction of travel of at least a portion of radiant energy within said optical wave guide to effect capture of a fraction of the internally incident radiation in guided modes of said optical wave guide and by cumulative propagation of trapped radiation energy along said wave guide length dimension to thereby effect a concentration of radiation energy and emission at at least one of said ends of said optical wave guide.

9. An radiation energy concentration device according to claim 8 in which said optical wave guide element has a core and including diffuser means within a coaxial region of said wave guide core aligned along the center line of said wave guide core and containing microspheres and/or microparticles of a size and material with the ability to reflect and or refract the incident radiation energy and effect a uniform internal scatter of the incident radiation energy within said wave guide core.

10. An radiation energy concentration device according to claim 9 in which said microspheres and microparticles that effect a scatter of the incident radiation energy are comprised of one or a combination of the following compounds and elements: air, water, argon, carbon dioxide, helium, hydrogen, methane, nitrogen, silver, aluminum, magnesium carbonate, rutile, zircon or glass and having different refractive index with respect to the core material.

11. An radiation energy concentration device according to claim 10 in which said wave guide core is a material transparent to the incident radiation wavelengths and selected from the group consisting of soda glass, crown glass, flint glass, acrylic polymer methylmethacrylate, polystyrene, polycarbonate, methylmethacrylate styrene copolymer, allyldiglycol carbonate or polymethylpentane.

12. An incident radiation energy concentration device according to claim 9 in which said wave guide core is encased by an outer cladding of material with a lower refractive index than the core material.

13. An incident radiation energy concentration device according to claim 12 in which said outer cladding is a material transparent to the incident radiation wavelengths and selected from the group consisting of soda glass, crown glass, flint glass, acrylic polymer methylmethacrylate, air, polystyrene, polycarbonate, methylmethacrylate styrene copolymer, allylcliglycol carbonate or polymethylpentane.

14. An incident energy concentration device comprising a first optical wave guide element as defined in claim 8, at least one further optical wave guide element, each said optical wave guide element being arranged in an array to interrupt incident radiation from a predetermined direction.

15. An energy concentration device comprising a first plurality of optical wave guide elements as defined in claim 8, said first plurality of optical wave guide elements being arrayed to intercept radiation from a predetermined direction, and at least one further said optical wave guide element arrayed relative to said first optical wave guide elements to intercept incident radiation transmitted through said first plurality of optical wave guide elements.

16. The energy concentration device as defined in claim 14 wherein said each optical wave guide element in said first plurality have their respective said second external surfaces arrayed in a common plane.

17. A method of concentrating radiant energy comprising,
 providing an optical wave guide having a length dimension and a first external surface exposed to receive incident radiation between said length dimension and a second external surface exposed to emit radiation at one end of said length dimension,
 exposing said first external surface to incident radiation,
 converting the direction of at least a portion of said energy within said optical wave guide to effect an internal capture of a fraction of the incident radiant energy in guided modes of said optical wave guide and by cumulative propagation of trapped radiation energy along said optical wave guide length dimension to effect a concentration of radiation energy and emission at at least one of said ends of said optical wave guide.

18. The method of concentrating radiant energy as defined in claim 17 in which there is provided at least one further object wave guide arrayed in such a way relative to the first said optical wave guide that incident radiant energy passing through the first said optical wave guide constitutes the incident radiation of said further optical wave guide to which the first external surface thereof is exposed, and converting the direction of at least a portion of said incident radiation in said at least one further optical wave guide to effect capture of a further portion of the incident radiation energy in guided modes of said optical wave guide by cumulative propagation of trapped radiation energy along said further optical wave guide length dimension to effect concentration of radiation energy and emission of same at at least one end of said further optical wave guide.

* * * * *